United States Patent [19]
Lovie et al.

[11] Patent Number: 6,135,553
[45] Date of Patent: Oct. 24, 2000

[54] CHILD SAFETY SEAT

[75] Inventors: David Lovie, Hants, United Kingdom; Robert Stephen Bell, Solna, Sweden

[73] Assignees: Britax Nordiska Barn AB, Bromma, Sweden; Britax Excelsior Limited, Warwick, United Kingdom

[21] Appl. No.: 09/452,246

[22] Filed: Dec. 1, 1999

[30] Foreign Application Priority Data

Dec. 4, 1998 [GB] United Kingdom .................... 9826622

[51] Int. Cl.[7] ...................................................... A47C 1/08
[52] U.S. Cl. ..................................... 297/250.1; 297/284.1
[58] Field of Search .............................. 297/250.1, 361.1, 297/366, 353, 284.1, 284.7

[56] References Cited

U.S. PATENT DOCUMENTS

| | | |
|---|---|---|
| 1,734,180 | 11/1929 | Olson . |
| 2,777,502 | 1/1957 | Travis . |
| 3,121,592 | 2/1964 | Anderson . |
| 5,294,185 | 3/1994 | Koyanagi et al. . |
| 5,460,427 | 10/1995 | Serber . |
| 5,496,092 | 3/1996 | Williams et al. . |
| 6,019,426 | 2/2000 | Nakagawa . |
| 6,030,047 | 2/2000 | Kain . |

FOREIGN PATENT DOCUMENTS

| | | |
|---|---|---|
| 0287259 | 4/1988 | European Pat. Off. . |
| 0770515 A2 | 5/1997 | European Pat. Off. . |
| 2296655 | 7/1996 | United Kingdom . |

*Primary Examiner*—Milton Nelson, Jr.
*Attorney, Agent, or Firm*—Davis And Bujold

[57] ABSTRACT

A child safety seat for a motor vehicle comprising a seat body (10) having a back portion (16) and a seat portion (14), an upper back support (34) mounted on the back portion (16) for movement in a direction towards and away from the seat portion (14). The upper back support (34) is movable relative to the back portion (16) and the angle between the upper back support (34) and the seat portion (14) decreases as the upper back support (34) moves towards the seat portion (14).

18 Claims, 2 Drawing Sheets

CHILD SAFETY SEAT

FIELD

This invention relates to a child safety seat for a motor vehicle comprising a seat body having a back portion and a seat portion, an upper back support mounted on the back portion for movement in a direction towards and away from the seat portion, and control means for varying the position of the upper back support relative to the back portion.

RELATED ART

A seat of this type is disclosed in U.S. Pat. No. 5496092. The seat portion and the back portion both comprise flat panels. There is no provision of suitable support for the back of a very young child.

SUMMARY OF THE INVENTION

According to the invention, a child safety seat of the type described above has drive means coupling the upper back support to the back portion so that the angle between the upper back support and the seat portion decreases as the upper back support moves towards the seat portion.

Preferably, the head support comprises a central portion and side wings spaced apart from one another by a distance less than the width of the back portion of the seat.

DETAILED DESCRIPTION OF THE PREFERRED EMBODIMENT

Figure 1:
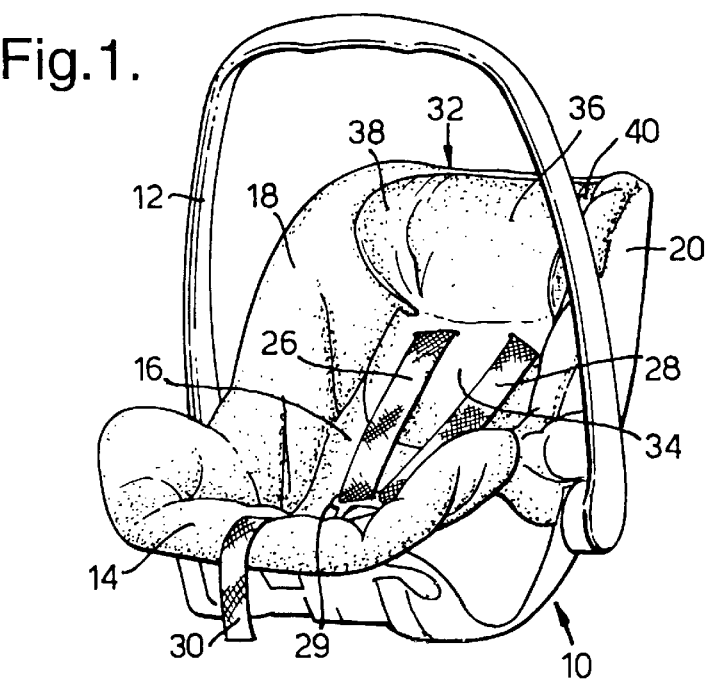
FIG. 1 is a perspective view of a child safety seat in accordance with the invention having a carrying handle.
Figure 2:
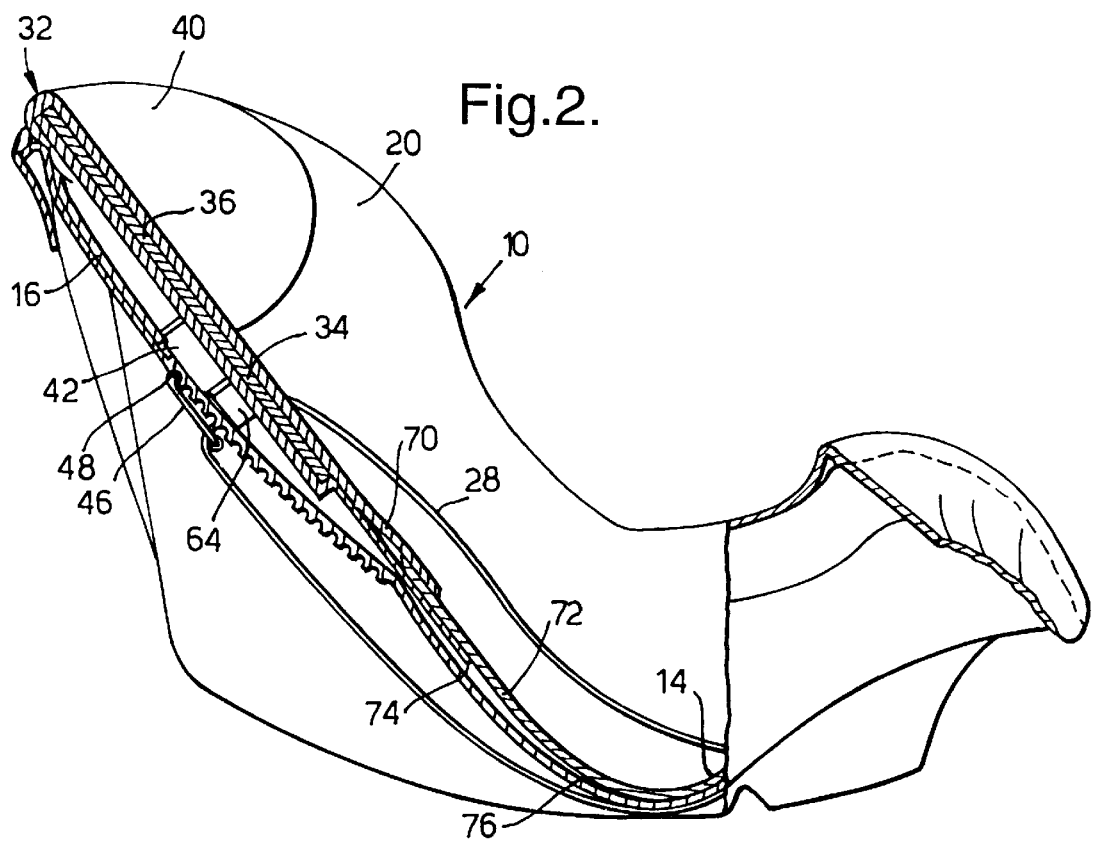
FIG. 2 is a side view of the seat shown in FIG. 1 with the handle removed partially broken-away along the longitudinal centre line of the seat, with the head support in its highest position.

FIGS. 1 and 2 show a child safety seat comprising a seat body 10 connected to a handle 12. The seat body 10 comprises a seat portion 14, a back portion 16 and side walls 18 and 20. A harness for a child occupant of the seat body 10 comprises shoulder straps 26 and 28 connected by a buckle 29 to a crotch strap (not shown). The shoulder straps 26 and 28 extend through slots in the back portion 16 behind which they are connected to a common strap 30 (see also FIG. 3) which projects through a strap adjuster (not shown) mounted near the front edge of the seat portion 14.

A head and upper back support 32 comprises an upper back support portion 34 above which is a central head support portion 36 and side wings 38 and 40. The head and upper back support 32 is slidably mounted on the back portion 16 so that the side wings 38 and 40 thereof are received between the side walls 18 and 20 of the seat body 10. As can be seen from FIG. 3, a projection 42 on the rear side of the head and upper back support 32 extends through a central slot 44 in the back portion 16. A locking lever 46 is pivotally mounted on the projection 42 by means of a pivot pin 48. The locking lever 46 has cam formations 50 and 52. A respective row of concave recesses 54 and 56 extend along each side of the central slot 44. When the locking lever 46 is positioned to lie substantially parallel to the back portion 16, as shown in FIG. 3, the cam formations 50 and 52 engage in respective recesses so as to prevent movement of the projection 42 along the slot 44.

Figure 3:
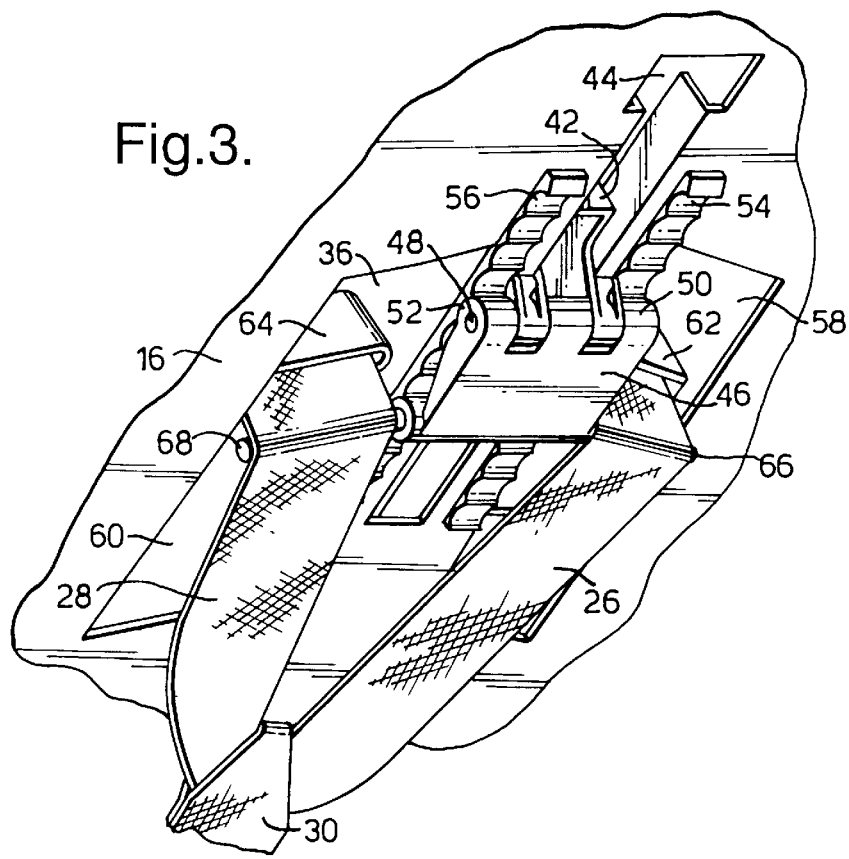
FIG. 3 is a scrap view of the back of the seat showing the control means for the head support.

As can be seen from FIG. 3, the seat back has two additional slots 58 and 60 extending parallel to the central slot 44, one adjacent to each row of concave formations 54, 56. Each of the slots 58 and 60 is aligned with a respective lateral hollow guide 62, 64 for a respective shoulder strap 26, 28, the guides 62 and 64 being formed integrally with the head and upper back support portion 32. The lower end of the locking lever 46 carries laterally projecting guide rods 66 and 68 round which the shoulder straps 26 and 28 extend before reaching the common strap 30. A flexible flap 70 (which may form part of a fabric cover for the headrest) hangs down below the bottom edge of the upper back support portion 34 so as to cover the upper edge of a portion 72 of a fabric cover for the seat 10.

FIG. 2 shows the head and upper back support 32 in its uppermost position, with the cam formations 50 and 52 in engagement with the top concave recesses in the series 54 and 56 respectively. When it is desired to lower the head and upper back support 32, the bottom edge of the locking lever 46 is pivoted away from the seat back 16 (clockwise as viewed in FIG. 2), thus disengaging the cam formations 50 and 52 from their respective concave formations 54, 56. Because the shoulder straps 26 and 28 extend round the guide rods 66 and 68, this cannot be done when the child harness is fastened round a child occupant of the seat.

Figure 4:
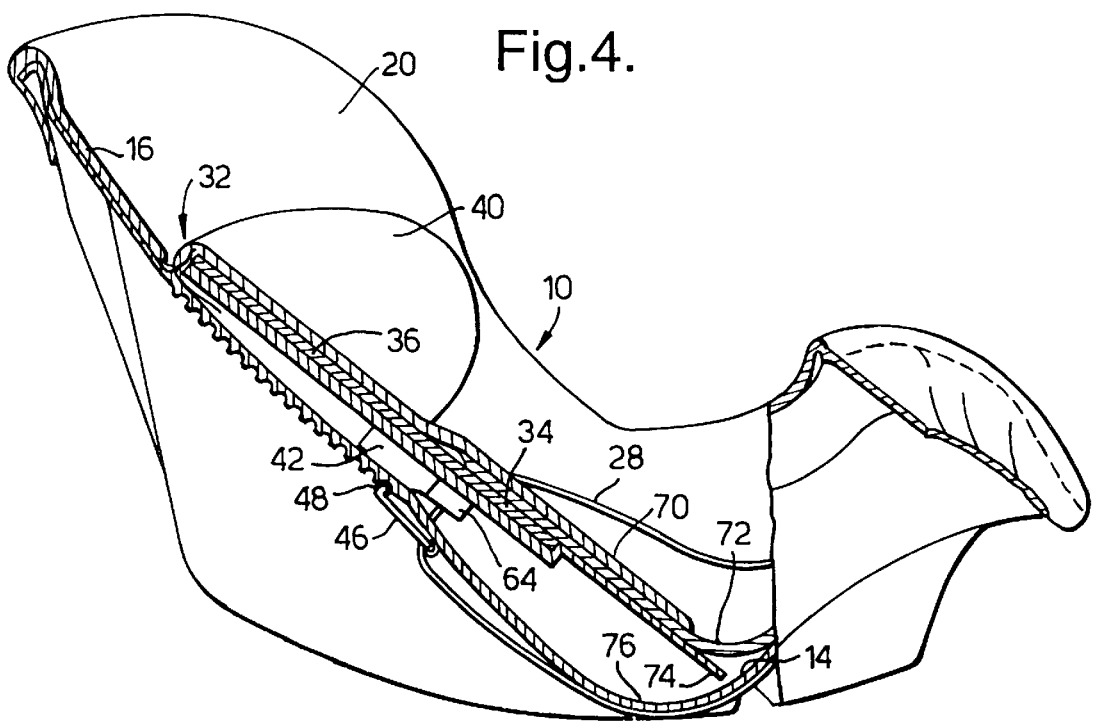
FIG. 4 is a view similar to FIG. 2 but showing the head support in its lowest position.

Next, the head and upper back support 32 is slid to the desired position, for example, an intermediate position (not shown) or the lowermost position as shown in FIG. 4. The bottom edge 74 of the upper back support portion 34 acts as a cam follower, engaging with a curved surface 76 on the seat body 10 where the back portion 16 runs into the seat portion 14, tilting the head and upper back support 32 to a more obtuse angle relative to the seat portion 14 and thus providing a reclined position which is more suitable for a very young child.

When this movement has been completed, the locking lever 46 is pivoted back into abutment with the seat back 16. Since the shoulder straps 26 and 28 extend through the guides 62 and 64 in the head and upper back support 32, the height at which the shoulder straps emerge through the seat back 16 is adjusted with the head and upper back support 32. When in its lowermost position as shown in FIG. 4, the head and upper back support 32 is inclined at a smaller angle to the horizontal than when in its uppermost position as shown in FIG. 2.

What is claimed is:

1. A child safety seat for a motor vehicle comprising a seat body having a back portion and a seat portion, an upper back support mounted on the back portion for movement in a direction towards and away from the seat portion, a camming mechanism comprising a cam surface on the seat body and a cam follower on the upper back support for varying the position of the upper back support relative to the back portion, said camming mechanism coupling the upper back support to the back portion so that an angle between the upper back support and the seat portion decreases as the upper back support moves towards the seat portion.

2. A child safety seat according to claim 1, wherein a head support is secured fast with the upper back support.

3. A child safety seat according to claim 2, wherein the head support comprises a central portion and side wings spaced apart from one another by a distance less than the width of the back portion.

4. A child safety seat according to claim 1, further comprising a latch lever operative in a first position to prevent movement of the upper back support and operative in a second position to allow movement of the upper back support.

5. A child safety seat according to claim 4, wherein the latch lever carries a cam formation arranged to engage with a complementary formation on the back portion when the latch lever is in its first position.

6. A child safety seat according to claim 5, further comprising a harness including two shoulder straps each projecting through a respective slot in the upper back support, and an inhibiting mechanism for resisting movement of the latch lever from its first position to its second position when the harness is fastened.

7. A child safety seat according to claim 6, wherein the inhibiting mechanism comprises guides for the shoulder straps.

8. A child safety seat according to claim 4, further comprising a harness including two shoulder straps each projecting through a respective slot in the upper back support, and an inhibiting mechanism for resisting movement of the latch lever from its first position to its second position when the harness is fastened.

9. A child safety seat according to claim 8, wherein the inhibiting mechanism comprises guides for the shoulder straps.

10. A child safety seat for a motor vehicle comprising a seat body having a back portion and a seat portion, a back support having an upper end and a lower end, a drive mechanism coupling the back support to the back portion operative to move the back support between a position parallel to the back portion and a position with its upper end at a location on the back portion above the seat portion, its lower end at a location on the seat portion in front of the back portion, so that an angle between the upper back support and the seat portion is constrained to decrease as the upper end of the upper back support moves towards the seat portion.

11. A child safety seat according to claim 10, wherein a head support is secured fast with the upper back support.

12. A child safety seat according to claim 11, wherein the head support comprises a central portion and side wings spaced apart from one another by a distance less than the width of the back portion.

13. A child safety seat for a motor vehicle comprising a seat body having a back portion and a seat portion, an upper back support mounted on the back portion for movement in a direction towards and away from the seat portion, a drive mechanism coupling the upper back support to the back portion for varying the position of the upper back support relative to the back portion so that an angle between the upper back support and the seat portion decreases as the upper back support moves towards the seat portion, and a latch lever operative in a first position to prevent movement of the upper back support and operative in a second position to allow movement of the upper back support.

14. A child safety seat according to claim 13, wherein the latch lever carries a cam formation arranged to engage with a complementary formation on the back portion when the latch lever is in its first position.

15. A child safety seat according to claim 14, further comprising a harness including two shoulder straps each projecting through a respective slot in the upper back support, and an inhibiting mechanism for resisting movement of the latch lever from its first position to its second position when the harness is fastened.

16. A child safety seat according to claim 15, wherein the inhibiting mechanism comprises guides for the shoulder straps.

17. A child safety seat according to claim 13, further comprising a harness including two shoulder straps each projecting through a respective slot in the upper back support, and an inhibiting mechanism for resisting movement of the latch lever from its first position to its second position when the harness is fastened.

18. A child safety seat according to claim 17, wherein the inhibiting mechanism comprises guides for the shoulder straps.

* * * * *